US006570820B2

(12) United States Patent
Patel et al.

(10) Patent No.: US 6,570,820 B2
(45) Date of Patent: May 27, 2003

(54) PRESSURE BALANCED INERTIA SOLENOID VALVE

(75) Inventors: Navin Patel, Friendswood, TX (US);
David McCall, Richmond, TX (US)

(73) Assignee: Input/Output, Inc., Stafford, TX (US)

( * ) Notice: Subject to any disclaimer, the term of this patent is extended or adjusted under 35 U.S.C. 154(b) by 0 days.

(21) Appl. No.: 09/883,871

(22) Filed: Jun. 18, 2001

(65) Prior Publication Data

US 2002/0191491 A1 Dec. 19, 2002

(51) Int. Cl.[7] .............................................. F16K 11/00
(52) U.S. Cl. ........................................................ 367/144
(58) Field of Search ....................... 367/144; 181/120; 251/129.07; 137/625.25

(56) References Cited

U.S. PATENT DOCUMENTS 3,800,832 A    4/1974   Umphenour et al. ... 137/625.65
3,929,315 A   12/1975   Rieth .................... 251/129.01
4,928,785 A    5/1990   Harrison ................... 181/120
5,301,920 A    4/1994   Ichiki ..................... 251/30.04
5,396,926 A *  3/1995   Pataki et al. ........... 137/625.65

* cited by examiner

Primary Examiner—Daniel T. Pihulic
(74) Attorney, Agent, or Firm—Madan, Mossman & Sriram, P.C.

(57) ABSTRACT

The present invention provides a pressure-balanced inertial valve assembly for use in marine seismic energy sources such as air guns. The valve includes a poppet having a first seal and a second seal. A pressure chamber containing a fluid under pressure communicating with the first and second seals to substantially balance the pressure across the seals. An inertial mass is coupled to the poppet. A coil assembly is disposed about the inertial mass. A central guide pin provides guided movement for axial translation.

25 Claims, 2 Drawing Sheets

PRESSURE BALANCED INERTIA SOLENOID VALVE

BACKGROUND OF THE INVENTION

1. Field of the Invention

This invention relates to seismic surveying and more particularly to a method and apparatus for initiating an acoustic wave in a body of water.

2. Description of the Related Art

Oil and gas exploration techniques include seismic surveying on land and at sea. Seismic surveying requires the introduction of energy into the earth. The energy is typically in the form of an acoustic wave. In marine seismic surveys, the acoustic waves penetrate the earth's crust and are reflected from the various strata therein. These reflected waves are analyzed to provide information indicative of the content and location of the subterranean strata from which the reflections take place. In these marine seismic surveys, the seismic wave is generated by a number of known sources such as an air gun array towed with a seismic vessel.

The term air gun as used herein refers to any number of devices used to initiate an acoustic wave in a body of water. An air gun has a pressurized chamber within a housing and a shuttle for opening and closing a port in the housing. When the port is opened, pressurized fluid such as air or other inert gas contained in the pressurized chamber rapidly egresses the chamber. The escaping fluid creates the seismic wave.

A solenoid valve assembly typically activates the shuttle. When the solenoid valve is activated, a firing chamber in the air gun assembly pressurizes to open the shuttle. Known valve assemblies include inertial solenoid valve assemblies and pressure balanced solenoid valve assemblies. Examples of these valves can be found described in the following U.S. Pat. No. 4,928,785 "Full Flow Solenoid Valve for Air Gun Operation" to Harrison, U.S. Pat. No. 3,929,315 "Solenoid Valve Assembly" to Rieth, U.S. Pat. No. 3,800,832 "Air Gun Firing Assembly" to Umphenour et al., and U.S. Pat. No. 5,301,920 "High-Speed Solenoid Valve Apparatus to Ichiki.

In the operation of an air gun using valves such as those identified above, the solenoid valve delivers high-pressure air to a firing chamber to activate a shuttle valve, which opens to allow an explosive egress of air from the gun into a body of water. This operation is commonly known as "firing" the gun even though no detonation or combustion takes place. The shuttle valve opens when the firing chamber reaches a triggering pressure. The rate at which pressure increases within the firing chamber determines the accuracy of triggering time. High pressure rate results in a smaller rise time or "time window" to trigger the shuttle valve and provides better accuracy of triggering time. Therefore, it is extremely important that the solenoid valve provides quick pressure rise.

Rise time is extremely important in understanding reflected waves. Wave analyses must be referenced to a time at which the acoustic wave was generated to accurately determine distance between the source and reflecting surface. A perfect input signal would be a step function with sharp contrast between pre and post firing of the gun and at a particular point in time. The slower the rise time of a input device, the more approximate the firing time. Therefore any determination based on the rise time becomes less accurate with increasing rise time.

In a typical valve, either a pressure balanced or a spring-loaded plunger is used between inlet and outlet ports. The plunger opens relatively slowly due to the pressure load or spring load. This increases the rise time. Additionally, guides for the moving plunger are consistently located in the flow path restricting airflow from solenoid valve to the firing chamber. Another disadvantage in a typical valve is that the moving parts are not protected from wear and tear caused by friction or impact between internal components. Thus the operational life of the typical valve is limited.

The operational life of a typical valve currently used is on the order of 150,000 to 200,000 shots or activation cycles. Ocean surveys may extend over thousands of miles of criss-crossing grid survey paths or lines. And during these surveys, shuttle activation valves must cycle several thousand times making the valves expensive maintence items in terms of cost and time required to repair a gun with a failed valve.

The inertial valve assembly suffers from short operational life and slow rise time. The operational life is limited by component impact caused by high pressure air forcing the valve closed after activation. The valve activation in a solenoid inertial valve assembly must overcome a high pressure differential to initiate the valve opening, and this causes a slow rise time.

The pressure balanced solenoid valve includes a pressure chamber in the valve to equalize pressure across two plunger seals. The pressure balanced valve reduces the force required to open the plunger. This reduced force tends to reduce wear and tear on the valve components. A drawback of the typical pressure balanced valve is that the plunger must extend into the flow path and restricts air flow to the outlet port of the valve assembly. This restricted flow increases the rise time for pressurizing the firing chamber.

The present invention overcomes some of these drawbacks by providing a pressure-balanced inertial valve assembly for use in seismic surveys.

SUMMARY OF THE INVENTION

In one aspect of the present invention a valve assembly is provided for use in applications requiring fast operation coupled with long operational life. Provided is a valve assembly comprising a valve housing having a first sealing surface. A poppet is in the housing, the poppet has a first end adapted for sealing engagement with the first sealing surface. A fluid chamber is within the housing for containing a fluid under pressure. The fluid chamber has a fluid passage that connects the fluid chamber to a second end of the poppet at a second sealing surface disposed between the second end of the poppet and the fluid passage. The fluid in the fluid chamber and the fluid passage exerts a predetermined pressure on each of the first and second sealing surfaces defining a pressure differential. An exit port in the housing is provided for releasing the fluid. An inertial mass is movably coupled to the poppet for moving the poppet from a sealed position to an open position.

In another aspect of the invention a seismic air gun for creating an acoustic wave in a body of water is provided. The air gun comprises a gun housing and a first chamber within the gun housing for containing a first fluid under pressure. A shuttle is operably coupled to the first chamber for opening the first chamber to the body of water. A second chamber is adapted to be pressurized by a second fluid, wherein the shuttle is operated upon pressurizing the second chamber with the second fluid. A solenoid valve assembly supplies the second chamber with the second fluid. The solenoid valve assembly further comprises a valve housing having a first sealing surface, a poppet having a first end adapted for sealing engagement with the first sealing surface, and a valve chamber within the housing for containing the second fluid under pressure. The valve chamber has a fluid passage connecting the valve chamber to a second end of the poppet at a second sealing surface disposed between the second end of the poppet and the fluid passage. The second fluid in the valve chamber and the fluid passage exert a predetermined pressure on each of the first and second sealing surfaces defining a pressure differential. An exit port in the housing is provided for releasing the fluid. A coil assembly is operatively associated with the poppet for moving the poppet axially within the housing, wherein the coil assembly includes a coil and a core movably coupled to the poppet for moving the poppet from a sealed position to an open position when the coil is provided with electrical energy. A controller is provided for controlling the solenoid valve assembly.

In another aspect of the present invention, a method is provided for activating an air gun with a valve assembly. The valve assembly includes a valve housing having a first sealing surface, a poppet having a first end adapted for sealing engagement with the first sealing surface, and a fluid chamber within the housing for containing a fluid under pressure. The fluid chamber has a fluid passage connecting the fluid chamber to a second end of the poppet at a second sealing surface disposed between the second end of the poppet and the fluid passage. The fluid in the fluid chamber and the fluid passage exert a predetermined pressure on each of the first and second sealing surfaces defining a pressure differential. An exit port in the housing is provided for releasing the fluid. An inertial mass is movably coupled to the poppet for moving the poppet from a sealed position to an open position. The method comprises sealing the first surface with the poppet, pressurizing the fluid chamber with the fluid thereby exerting the predetermined pressure on each of the first and second sealing surfaces to define the pressure differential, moving the poppet from a sealed position to an open position using the inertial mass, and releasing the fluid through the exit port in the housing, and activating the air gun with the released fluid.

DESCRIPTION OF THE PREFERRED EMBODIMENT

Figure 1:
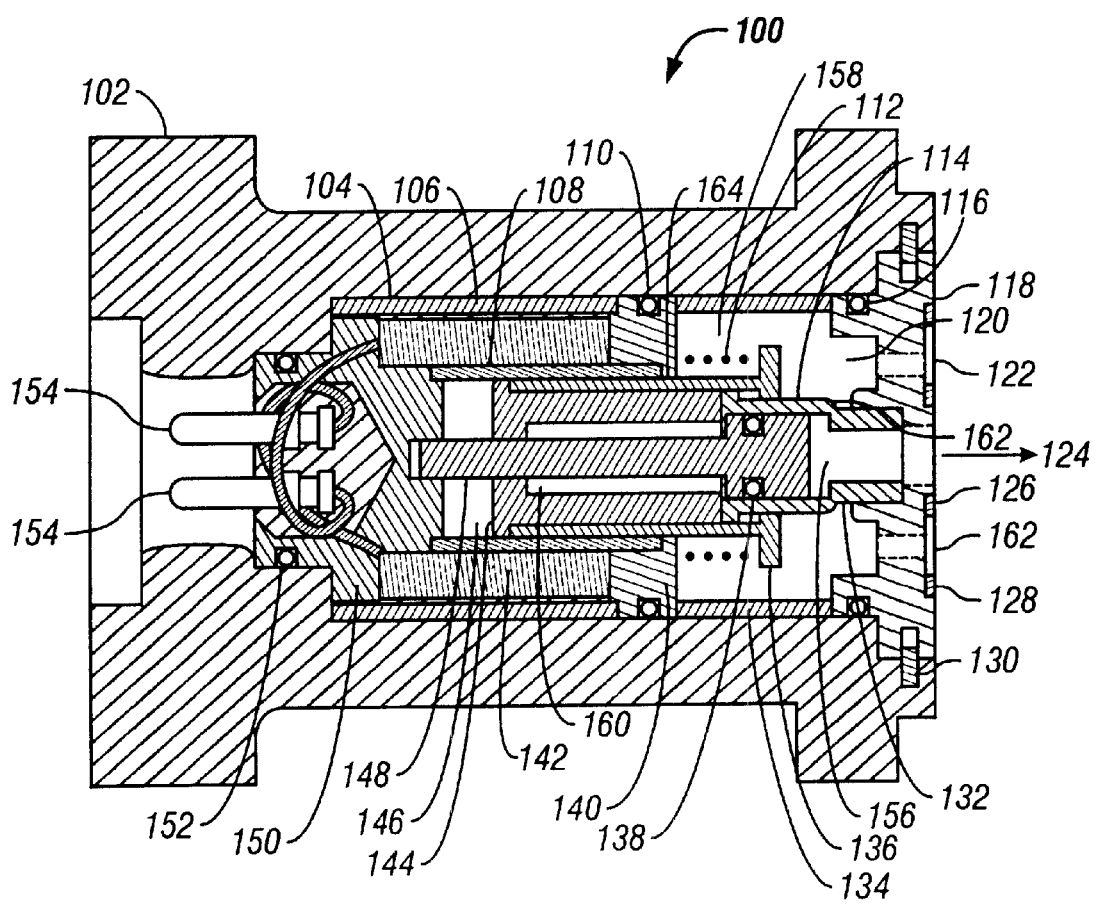
FIG. 1 is a cross sectional view of a pressure balanced inertial valve according to the present invention.

FIG. 1 is a cross sectional view of a solenoid valve in accordance with the present invention. The solenoid valve assembly 100 includes a nose section 118 coupled to a main housing 102. The nose section includes an inlet port 122 and an outlet port 124. In a preferred embodiment the housing 102 and nose section 118 are manufactured using corrosion resistant steel.

A coil assembly 104 is disposed within an inner cavity 158 of the housing 102. The coil assembly 104 includes a seal 110 at one end to prevent leakage of high-pressure air from the cavity 158. Another seal 152 at a second end of the coil assembly 104 provides a watertight seal to protect internal components from seawater leakage into the coil assembly 104. Also disposed within the coil assembly 104 is an annular solenoid coil 142, the coil having leads 154 which connect to an external power source (not shown) for actuating the valve 100. The coil assembly 104 also includes a top pole 150, a casing 106, a bottom pole 140, and an inner tube 108 that house the coil 142. Also included is an assembly comprising a shell 136 and core 144. The top pole 150, casing 106 and bottom pole 140 are preferably manufactured using a magnetically permeable stainless steel or other suitable material that allows magnetic flux to flow easily around the coil 142. The inner tube 108 is preferably made of a non-magnetic material such as stainless steel, which will direct magnetic flux to flow through the shell 136 and core 144 assembly and through an air gap 164 at one end of the core/shell assembly. This restriction of magnetic flux provides intensified magnetic pull on the core/shell assembly. The core 144 and shell 136 are preferably made of magnetically permeable stainless steel and may be press fit together to form the core/shell assembly.

The shell/core assembly includes a central axial cavity 160. A poppet 114 is disposed in the cavity 160 extending axially therefrom to engage a sealing surface 162 on the nose 118. A pressure chamber or valve chamber 120 is defined by the outer perimeter of the poppet 114, the inner surface of the nose 118, a surface of the bottom pole 140, and the housing 102 or a spacer 134 as shown in FIG. 1. A gap between the shell/core assembly and the inner tube 108 creates a fluid passage 164 extending from the valve chamber 120 and the central cavity 160 of the core/shell assembly. The passage 164 is continuous, so pressurized fluid may flow from the valve chamber 120 through the passage 164 to the central cavity 160.

In one embodiment, a seal such as an O-ring seal 132 may be disposed between the poppet 114 and nose 118 to provide a pressure seal to the outlet port 124 is closed thereby preventing high pressure air from exiting the valve assembly 100.

In one embodiment, a spring 112 provides a biasing force for the positive return of the core/shell assembly and also provides added force for pushing the poppet 114 against the O-ring seal 132.

A pin 148 is slidably positioned in the top pole 150 and extends axially through the center of the valve assembly 100 and through the core/shell cavity 160. The pin 148 is a guide to restrict radial movement of the core/shell assembly and of the poppet 114. The pin 148 is preferably manufactured from a non-magnetic material such as stainless steel.

In one embodiment, the pin 148 is coated with, for example, a layer of hard anti-friction, anti-wear material such as Nedox®, available from General Magnaplate Corporation, 1331 Route 1, Linden, N.J. 07036. The present invention is not limited to the use of the material identified for the purpose of example. Any material providing a low coefficient of friction, corrosion resistance, and long wear properties may be suitable and thus within the scope of the invention.

The core 144 and the poppet 114 slide over the pin 148 during opening and closing of the valve assembly 100. In one embodiment, the pin 148 includes one or more seals 138 at the interface between the pin 148 and poppet 114. The seal 138 preferably includes a Teflon O-ring seal loaded by standard O-ring. The Teflon seal provides very low frictional resistance to the poppet 114 during its motion thereby increasing opening speed.

The difference in the sealing diameters of the poppet 114 at seal 138 and at O-ring seal 132 is very small. Therefore the poppet 114 is nearly pressure balanced. The small difference in diameters provides a positive pressure load on the poppet 114 to seal against the O-ring 132. In another embodiment, the sealing diameters at seal 138 and at seal 132 are substantially equal to provide near zero pressure differential. This embodiment provides a fully balanced poppet.

A spacer 134 may be installed between the coil assembly 104 and nose 118 to prevent the coil assembly 104 from sliding when electrical connection is made to the leads 154.

A groove in the nose 118 carries an O-ring seal 116 to provide a pressure seal between nose 118 and the housing 102. A snap ring 130 disposed between the nose 118 and housing 102 helps to secure all the components. Other O-ring seals 126 and 128 are disposed in the nose 118 to provide a seal between the inlet 122 and outlet 124 when the valve is installed on the air gun.

During operation, the poppet 114 is preferably initially biased in a closed position by the spring 112. The valve chamber 120 of the solenoid valve 100 is pressurized with a suitable fluid such as air to a predetermined pressure, typically 2000 psi, through the valve inlet 122. The closed poppet 114 prevents the air from discharging through the outlet 124. Seal 138 and O-ring 132 provide pressure sealing.

When electric current is applied to the terminals 154, the coil 142 is energized and induces an axially oriented magnetic field in the magnetic circuit. Magnetic flux flows through top pole 150, across the air gap 146 and through the core/shell assembly to the bottom pole 140. A casing 106 completes the return path for magnetic flux from the bottom pole 140 to the top pole 150. Thus, the entire magnetic circuit is defined by corrosion resistance permeable steel.

When the valve 100 is energized, the top pole 150 attracts the core/shell assembly. The core/shell assembly has very small resistance from return spring 112, so it slides with high velocity and impacts poppet 114. In a preferred embodiment, the mass of the core/shell assembly is much larger than the mass of the poppet 114. In one embodiment, the core/shell assembly mass is approximately nine times the mass of the poppet 114. Therefore the inertia of the core/shell assembly is very high compared to the inertia of the poppet 114. The core/shell assembly easily moves the poppet 114 from its closed position to a fully open position in a substantially instantaneous fashion. With the poppet 114 in the open position, high pressure air passes from valve chamber 120 to the outlet 124 via vent holes 156 formed in the pin 148. When the flow of electrical current through the terminals 154 is stopped, the magnetic field around the coil 142 decays. The spring 112 forces the core/shell assembly and poppet 114 back to the closed position.

In one embodiment, the valve operation is controlled by a controller (not shown). The controller regulates electrical current flow to the terminals 154.

Figure 2:
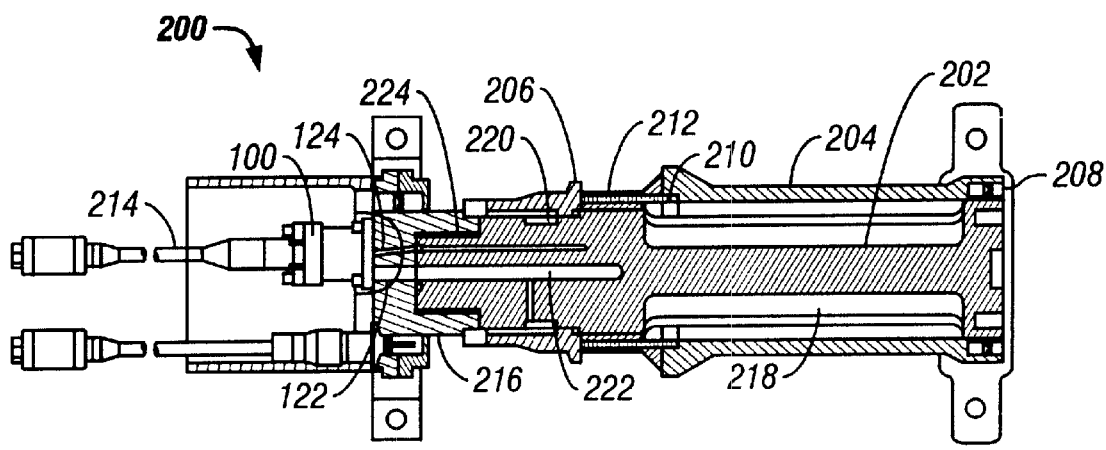
FIG. 2 is a cross sectional view of an air gun assembly according to the present invention.

FIG. 2 is a cross-section view of an air gun according to the present invention including the solenoid valve assembly 100 of FIG. 1. The air gun 200 has a main body 202. A housing comprises a sleeve 204 coupled to the main body 202 by suitable fasteners such as bolts 208. The housing further comprises a shuttle assembly 206 coupled to the main body and biased to seal against a face seal 210 on the sleeve 204. A sleeve cap 216 is shown coupled to an end portion of the main body 202. A solenoid valve assembly 100 is coupled to the sleeve cap 216. The control cable 214 is coupled to the solenoid valve assembly 100. The fluid line is connected to the cap 216.

A completed assembly includes a sleeve chamber 218 defined by the main body 202 and sleeve 204. A firing chamber 212 is defined between the main body 202 and shuttle sleeve 206. The output port 124 and inlet port 122 of the valve assembly 100 are coupled to output line 224 and input line 222 respectively. In a preferred embodiment, the input line 222 and output line 224 are integral to the main body 202. The input line 222 is connected to main air supply and the output line 224 is connected to firing chamber 212.

In operation, the sleeve chamber 218 contains pressurized fluid such as air or some other inert gas under high pressure supplied to the air gun via the input fluid line 222. The shuttle assembly 206 is preferably biased to seal the sleeve chamber 218 at the seal face 210. A controller (not shown) sends a suitable signal to the solenoid valve assembly 100 via input signal line 214, and the valve assembly opens as described above with respect to the valve assembly 100 of FIG. 1. Opening of the valve allows the firing chamber 212 to pressurize. The pressurizing of the firing chamber 220 initiates the shuttle assembly 206 to move axially along the main body 202. The high pressurized fluid in sleeve chamber 218 provides a large push on the bottom face of the shuttle assembly 206. This large push forces the shuttle assembly to open completely in a few milliseconds. When moved in this manner, the shuttle assembly 206 opens the sleeve chamber 218 at the seal face 210 to allow the pressurized fluid to explosively exit through an opening created at the seal face 210. The exiting fluid enters a body of water in which the air gun 200 is operated thereby initiating an acoustic wave in the body of water.

The wave propagates through the water and into the earth. The portion of the wave reflects off of various formation surfaces and the reflected wave is sensed by acoustic sensors such as hydrophones (not shown). The hydrophones then generate signals that are processed by a second controller (not shown) to determine characteristics of the formations.

Referring to FIGS. 1 and 2, the invention thus described above provides multiple advantages over the typical solenoid valve used in marine seismic energy sources. The valve assembly 100 of the present invention helps to fire an air gun 200 with consistent time performance and with long operational life. An advantage of the present invention is that the poppet 114 is nearly pressure balanced. Therefore it requires very small force to move it from its closed position to the opened position. The core/shell assembly, which is substantially free to move, has a very small load from a return spring 112. As the valve 100 is energized, the magnetic flux across the air gap pulls the core/shell assembly very quickly. The fast moving core/shell assembly impacts the poppet 114 thereby acting as an inertial mass. The high inertia of the core/shell assembly relative to the poppet moves the poppet from its closed position to a fully open position much more quickly than a typical poppet valve. This inertial impact reduces the time required to open the valve. The fast opening of the valve 100 allows the pressurized air to fill an air gun firing chamber 212 very quickly. The importance of this is that the fast pressure build up in the firing chamber 212 results in improved timing of the air gun firing (i.e. less jitter in firing).

Figure 3:
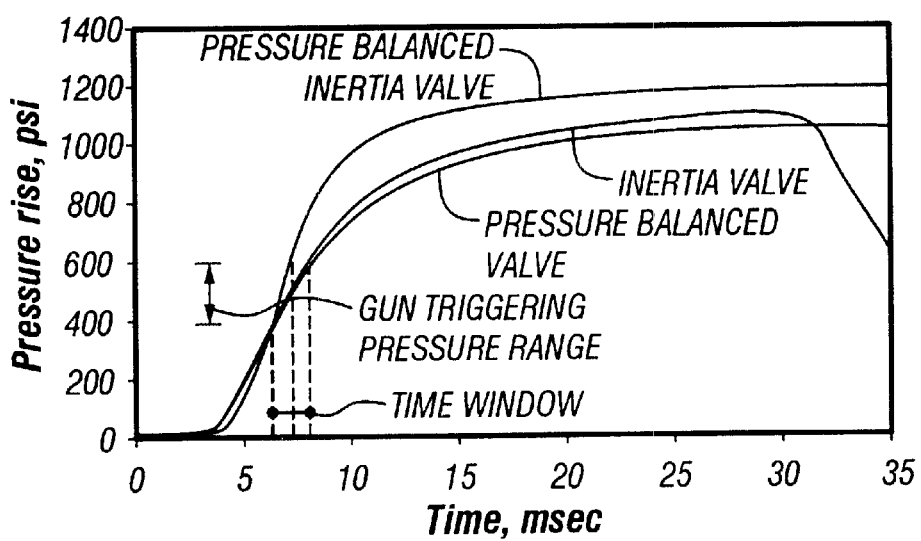
FIG. 3 is a plot of pressure rise data acquired by testing a valve according to the present invention compared to data acquired using conventional valves.

FIG. 3 is a plot of pressure rise data acquired by testing a valve according to the present invention and conventional valves illustrating the decrease in rise time provided by the present invention. The plot shows the pressure rise from conventional valves as opposed to the pressure balanced inertia valve of the present invention.

The output of a conventional valve, as with the valve of the present invention, pressurizes a firing chamber in an air gun. The level at which the pressure in the firing chamber opens a shuttle assembly is known as a trigger level. The level is actually the upper end of a range of pressures shown on the plot as the "gun triggering pressure range". The time range labeled "time window", is the time during which the pressure rises through the gun triggering pressure range, and most guns are designed to fire within the time window.

The valve of present invention helps to ensure that pressure rises to the gun triggering level much faster than in conventional valves. Also, the slope of the pressure rise in the present invention is steeper than the other valves. Hence the time window to trigger the gun is much smaller, thereby increasing the accuracy of the gun timing and repeatability.

Valve speed and longevity are both increased with the present invention. As described above and shown in FIG. 1, the core/shell assembly and the poppet 114 slide over a stationary pin 148. The pin 148 is coated with hard antifriction material. Reducing the friction between internal components in this manner provides long life of the moving components. Another advantage of the centralized guide pin 148 is that the poppet 114 does not have to extend into the exit port to maintain its position as in a typical pressure balance valve. Accordingly, there is less restriction to the air exiting the valve, thus increasing the flow rate and decreasing the rise time for operating the air gun.

The foregoing description is directed to particular embodiments of the present invention for the purpose of illustration and explanation. It will be apparent to one skilled in the art, however, that many modifications and changes to the embodiment set forth above are possible without departing from the scope and the spirit of the invention. It is intended that the following claims be interpreted to embrace all such modifications and changes.

What is claimed is:

1. A valve assembly comprising:
   (a) a valve housing having a first sealing surface;
   (b) a poppet having a first end adapted for sealing engagement with the first sealing surface;
   (c) a fluid chamber within the housing for containing a fluid under pressure, the fluid chamber having a fluid passage connecting the fluid chamber to a second end of the poppet at a second sealing surface disposed between the second end of the poppet and the fluid passage, the fluid in the fluid chamber and the fluid passage exerting a predetermined pressure on each of the first and second sealing surfaces defining a pressure differential;
   (d) an exit port in the housing for releasing the fluid; and
   (e) an inertial mass movably coupled to the poppet for moving the poppet from a sealed position to an open position.

2. The valve assembly of claim 1, wherein the valve housing includes an inlet port for supplying the pressurized fluid to the fluid chamber.

3. The valve assembly of claim 1, wherein the poppet is substantially cylindrical in shape.

4. The valve assembly of claim 1, wherein the pressurized fluid is air.

5. The valve assembly of claim 1 further comprising an electrical solenoid coil including a core/shell assembly, wherein the inertial mass is the core/shell assembly.

6. The valve assembly of claim 1 further comprising a pin axially disposed within the housing for guiding movement of the poppet.

7. The valve assembly of claim 6, wherein the pin includes an outer layer, the outer layer having a low coefficient of friction.

8. The valve assembly of claim 7, wherein the outer layer is corrosion resistant.

9. The valve assembly of claim 1, wherein the pressure differential provides a pressure bias for closing the poppet.

10. The valve assembly of claim 1 further comprising a biasing member for biasing the inertial mass position.

11. The valve assembly of claim 10 wherein the biasing member is a spring.

12. A seismic air gun for creating an acoustic wave in a body of water, comprising:
   (a) a gun housing;
   (b) a first chamber within the gun housing for containing a first fluid under pressure,
   (c) a shuttle operably coupled to the first chamber for opening the first chamber to the body of water;
   (d) a second chamber adapted to be pressurized by a second fluid, wherein the shuttle is operated upon pressurizing the second chamber with the second fluid;
   (e) a solenoid valve assembly for supplying the second chamber with the second fluid, the solenoid valve assembly further comprising,
      (i) a valve housing having a first sealing surface;
      (ii) a poppet having a first end adapted for sealing engagement with the first sealing surface;
      (iii) a valve chamber within the housing for containing the second fluid under pressure, the valve chamber having a fluid passage connecting the valve chamber to a second end of the poppet at a second sealing surface disposed between the second end of the poppet and the fluid passage, the second fluid in the valve chamber and the fluid passage exerting a predetermined pressure on each of the first and second sealing surfaces defining a pressure differential;
      (iv) an exit port in the housing for releasing the fluid; and
      (v) a coil assembly operatively associated with the poppet for moving the poppet axially within the housing, wherein the coil assembly includes a coil and a core movably coupled to the poppet for moving the poppet from a sealed position to an open position when the coil is provided with electrical energy; and
   (f) a controller for controlling the solenoid valve assembly.

13. The seismic air gun of claim 12, wherein the poppet is substantially cylindrical in shape.

14. The seismic air gun of claim 12, wherein the first and second fluids are air.

15. The seismic air gun of claim 12, wherein the solenoid valve assembly further comprises a pin axially disposed within the housing for guiding movement of the poppet.

16. The seismic air gun of claim 15, wherein the pin includes an outer layer, the outer layer having a low coefficient of friction.

17. The seismic air gun of claim 16, wherein the outer layer is corrosion resistant.

18. The seismic air gun of claim 12, wherein the pressure differential provides a pressure bias for closing the poppet.

19. The seismic air gun of claim 12, wherein the solenoid valve assembly further comprises a biasing member for biasing an inertial mass position.

20. The seismic air gun of claim 19 wherein the biasing member is a spring.

21. A method of activating an air gun with a valve assembly, the valve assembly having, a valve housing having a first sealing surface;

a poppet having a first end adapted for sealing engagement with the first sealing surface;

a fluid chamber within the housing for containing a fluid under pressure, the fluid chamber having a fluid passage connecting the fluid chamber to a second end of the poppet at a second sealing surface disposed between the second end of the poppet and the fluid passage, the fluid in the fluid chamber and the fluid passage exerting a predetermined pressure on each of the first and second sealing surfaces defining a pressure differential;

an exit port in the housing for releasing the fluid; and an inertial mass movably coupled to the poppet for moving the poppet from a sealed position to an open position, wherein the method comprises:
- (a) sealing the first surface with the poppet;
- (b) pressurizing the fluid chamber with the fluid thereby exerting the predetermined pressure on each of the first and second sealing surfaces to define the pressure differential;
- (c) moving the poppet from a sealed position to an open position using the inertial mass;
- (d) releasing the fluid through the exit port in the housing; and
- (e) activating the air gun with the released fluid.

22. The method of claim 21, wherein pressurizing the fluid chamber further comprising pressurizing the fluid chamber through an inlet port in the valve housing.

23. The method of claim 21, wherein the valve assembly further comprises an electrical solenoid coil including a core/shell assembly used as inertial mass forming a core of the solenoid coil, the method further comprising energizing the electrical solenoid coil to move the poppet axially.

24. The method of claim 21, wherein the valve assembly further comprises a pin axially disposed within the housing, the method further comprising guiding movement of the poppet using the pin.

25. The method of claim 21 further comprising biasing the inertial mass position with a spring.

* * * * *